United States Patent [19]

Baba et al.

[11] 4,220,500
[45] Sep. 2, 1980

[54] GLASS-CONTAINING SHEET SUBSTRATE

[75] Inventors: Toshiyuki Baba; Isao Ebihara; Masatoshi Minegishi, all of Tokyo, Japan

[73] Assignee: Mitsubishi Paper Mills, Ltd., Tokyo, Japan

[21] Appl. No.: 1,206

[22] Filed: Jan. 5, 1979

[30] Foreign Application Priority Data

Jan. 13, 1978 [JP] Japan ................... 53-2424

[51] Int. Cl.$^2$ ......................... D21H 1/40; B05D 3/02; D04H 1/16
[52] U.S. Cl. .................................. 162/127; 162/129; 162/135; 162/136; 162/145; 162/146; 162/168 R; 162/169; 162/183; 427/389.8; 428/282; 428/286; 428/288; 428/289; 428/426; 428/442
[58] Field of Search ............... 162/129, 135, 145, 123, 162/125, 127, 183, 184, 185, 168 R, 169, 136; 428/286, 288, 426, 442, 289, 282; 427/390

[56] References Cited

U.S. PATENT DOCUMENTS

| | | | |
|---|---|---|---|
| 2,881,072 | 4/1959 | D'Clark ............................. | 162/145 |
| 3,441,472 | 4/1969 | Foster ................................ | 162/145 |
| 3,622,447 | 11/1971 | Vander Geer et al. ............ | 162/169 |
| 3,749,638 | 7/1973 | Renaud et al. ..................... | 162/145 |
| 4,121,966 | 10/1978 | Amano et al. ..................... | 162/169 |

*Primary Examiner*—S. Leon Bashore
*Assistant Examiner*—Peter Chin
*Attorney, Agent, or Firm*—Cushman, Darby & Cushman

[57] ABSTRACT

A non-woven glass fiber-containing sheet composed of a top layer of a mixture of glass fiber with other fiber and a back layer of a mixture of fiber other than glass fiber with polyvinyl chloride fiber or polyvinyl chloride latex flocculate is a suitable substrate for processing it into flooring, walling, roofing, etc. by impregnating it with a polyvinyl chloride sol to strengthen the sheet without exudation of the sol onto the back layer surface.

6 Claims, No Drawings

GLASS-CONTAINING SHEET SUBSTRATE

The present invention relates to a glass fiber-containing two layer non-woven sheet substrate, and more particularly to the same suitable for being treated with polyvinyl chloride sol to give indoor structural materials.

Because of its excellent heat-dimensional stability generally recognized as the most important characteristic, the glass fiber-containing non-woven sheet has found application in various uses as an industrial substrate material and manufactured by wet paper-making method.

The glass fiber-containing non-woven glass sheet is produced by subjecting a slurry mixture of glass short fibers and other short fiber capable of being intertwined with glass fibers to wet paper-making method in the presence of a binder.

Owing to its extremely high porosity and irritant surface, the conventional glass fiber-containing non-woven sheets (hereinafter referred merely to as glass sheet) involve many problems in practical use. For instance, when they are used as a substrate for making various kinds of indoor structural materials such as flooring, roofing, walling, etc., by availing of its high heat-dimensional stability, there is in most cases required secondary treatment such as coating or impregnation with a vinyl chloride sol or such for compensating for said structural defects. However, the secondary treatment is not easy for obtaining good product, because the polyvinyl chloride sol is so liable to penetrate the layer that sometimes it does not remain on the surface when coating is desired, and sometimes strikes through to the opposite surface when impregnation is desired.

The structural defects of the glass fiber sheet substrate are cured to some extent by providing on the glass sheet layer a layer composed of fibers other than glass fibers. However, the cure of such defects can not be attained even in the above two layer structure without careful consideration of selecting the sol and a sacrifice of the interfacial strength between the glass fiber layer and the other fiber layer of the sol-impregnated product.

In order to prevent the penetration of the sol from the glass fiber surface to the opposite surface of the other fiber layer by applying the sol to the glass fiber surface, the viscosity of the sol should naturally be controlled. However, an extraordinarily viscous sol can not be used due to insufficient capacity of the ordinal coating machine. Accordingly, it is necessary to select the structure of the two layer glass sheet substrate so as to fit in the characteristics of the sol. Thus, it was attempted that the surface layer to which the sol is applied is made dense, or made of or incorporated with polyvinyl chloride short fibers or resin having an affinity to the sol to prevent the penetration. However, the attempt was not achieved, because the interfacial strength between the two layers of the product became low. On the contrary, when the surface layer was made coarse and the back layer of the other fiber was made dense, the interfacial strength did not increase even if the strike-through of the sol was prevented. When a low density sol and a high density sol were successively applied to the surface, a good product might be obtained. But such two-step process is costly.

An object of the present invention is to provide a two layer glass fiber-containing non-woven sheet substrate which gives polyvinyl chloride sol-impregnated sheet without striking-through of the sol.

Another object of the invention is to provide the same which gives polyvinyl chloride sol-impregnated sheet having a high interfacial strength of the two layers.

There is provided according to the present invention a two-layer glass fiber-containing non-woven sheet substrate comprising a top layer of a mixture of glass fibers with other fiber except for polyvinyl chloride fiber, which is capable of being intertwined with glass fiber, and a back layer of a mixture of polyvinyl chloride fibers, polyvinyl chloride latex flocculate or mixture thereof with the said other fibers.

There is also provided according to the present invention a method of producing the above two-layer glass fiber-containing non-woven sheet substrate comprising subjecting in optional order a slurry mixture of glass fibers with other fibers except for polyvinyl chloride fibers, which is capable of being intertwined with glass fibers and a slurry mixture of polyvinyl chloride fibers, polyvinyl chloride latex flocculate or mixture thereof with the said other fibers to wet paper-making in the presence of a binder.

The glass fiber used in the present invention is conventional as the material in producing glass fiber sheet. The other fibers capable of being intertwined with glass fibers includes pulp, cotton, wool, rock wool, asbestos, rayon, vinylon (polyvinyl alcohol synthetic fiber) and polyamide and polyester and the like. Glass fibers is usually used in an amount of 35% by weight or more, preferably 35 to 60 wt%, based on the total amount of fibers used in the top layer.

As the binder used in this invention there is used usually polyvinyl alcohol of which type is fibrous in form and mixable uniformly with the fiber slurry. The amount of polyvinyl alcohol is variable according to the kind of the fibers used, but it is usually within the range of 5 to 30 wt%, preferably 5 to 20 wt%, based on the total weight of the fibers in the substrate.

The polyvinyl chloride fiber used in the back layer of the glass sheet substrate of the present invention is short fiber and capable of being intertwined with other fibers as well as glass fiber. The polyvinyl chloride latex flocculate used in this invention is preferably of the type which has a grain size of 100 to 500 microns and which is well mixable in the fiber slurry and can be also incorporated with good yield in the sheet forming step. Such flocculate can be obtained from the methods well known in the art. For example, a flocculate of polyvinyl chloride with fine particles can be obtained by adding a water-soluble cationic polymer or a polyvalent metal to an anionic polyvinyl chloride latex. There are available various methods for controlling the particle size distribution of the flocculate, and the following methods may be employed for obtaining a flocculate with particle size of 100 to 500 microns convenient for use in this invention: a water-soluble cationic polymer is added to the latex at pH 6-9 to deposit a preflocculate with particle size of less than 50 $\mu$, and then the pH is lowered to 2-4 (U.S. Pat. No. 3,776,812); a water-soluble cationic polymer is added at pH of over 7 in the presence of zinc white (Japanese Patent Application Kokai (Laid-Open) No. 92303/76); the latex is heated at a temperature higher than the lowest film-forming temperature of the latex and then a water-soluble cationic polymer of a polyvalent metal salt is added (Japanese Patent Application Kokai (Laid-Open) No. 105406/76); and anionic latex having the lowest film-forming temperature of higher than 10° C., such as a polyacrylic ester, synthetic rubber latex, etc., is added to the latex, warmed and then a water-soluble cationic polymer or a polyvalent metal salt is added (Japanese Patent Application Kokai (Laid-Open) No. 105407/76). A mixture of the polyvinyl chloride fiber and latex flocculate may be used. The amount of the polyvinyl chloride fiber, latex flocculate or mixture thereof used is 5-40% by weight, preferably 10-40% by weight based on the back layer.

The sheet making process according to this invention is well known in the art for multilayer paper making, in which the fiber slurry is formed into a first sheet on a metal gauze, and then another fiber slurry is formed into a second sheet on the first sheet. The steps can continuously be conducted. In this invention either of the slurry of materials of top layer or that of back layer may firstly be made into the first sheet.

The two layer glass fiber-containing non-woven sheet substrate of the present invention can conveniently be impregnated and reinforced with polyvinyl chloride sol to form a sheet materials such as flooring, roofing, walling, etc., without striking-through of the sol and losing the intrinsic stability to heat and with reinforcement of the interfacial strength of the glass fiber-containing layer and the other fiber layer. Thus, polyvinyl chloride sol having a relatively wide viscosity can be used in the secondary treatment, although the viscosity is selected appropriately depending on the capacity of coating machine, porosity of the substrate. The sol impregnates the present substrate thoroughly from the top layer to the back layer without striking-through to the surface of the back layer. This causes an increase of the interfacial strength. These effects are considered to be contributed by the affinity of the polyvinyl chloride materials present in the back layer to the sol.

The present invention may be applied to three or more layer glass fiber-containing non-woven sheet substrate of which the structure comprises a top-layer of glass fiber-containing layer, one or more intermediate layer of the said other fibers and the back layer of the mixture of polyvinyl chloride fibers or latex flocculate with the said other fibers.

The present invention is explained in more detail by referring to the following Examples to which the present invention is not limited as well as Experiments.

In the Examples and Experiments the interfacial strength resistance to pealing off is measured with respect to the specimen (50 mm×200 mm) cut from the sol-impregnated sheet product which has been heated at 190° C. for 20 seconds to complete gelation of the sol therein and cut longitudinally along the interface of the two layers, by means of Tensilon ® tensile testing machine (sold by Toyoseiki Co.).

The porosity of the sheet substrate or layer is determined by measuring permeability by the use of a Frazier Type tester.

The striking-through of the sol is evaluated by placing the glass sheet substrate on a glass plate, applying uniformly a colored polyvinyl chloride sol onto the top layer surface of the substrate by means of an applicator bar and then evaluating the extent of the sol struck through onto the glass plate surface.

EXAMPLES 1-12

In these Examples the twelve glass fiber-containing sheet substrates were produced, respectively, by subjecting the slurry for the top layer and that for the back layer according to usual wet paper-making method, the basic materials contained in both sluries being as follows:

|  | Parts by weight |
| --- | --- |
| For top layer | |
| Glass fiber (diameter: 9μ, length: 6 mm) | 50 |
| Vinylon*[1] (fineness: 2 denier, length 6 mm) | 30 |
| Polyvinyl alcohol binder | 20 |
| For back layer | |
| NBKP*[2] (CSF*[3]: 450 ml) | 30 |
| Rayon (fineness: 1.5 denier, length 7 mm) | 30 |
| Polyester fiber (fineness: 2 denier, length 7 mm) | 30 |
| Polyvinyl alcohol binder | 10 |

*[1]Polyvinyl alcohol synthetic fiber.
*[2]Needle Leaved Bleached Kraft Pulp
*[3]Canadian Standard Freeness.

In Examples 7 to 9, to the materials for the back layer was added 10 parts by weight of polyvinyl chloride fiber (Tevylon ®, fineness: 2 denier, length: 6 mm; sold by Teijin Co.), and in Examples 10 to 12, 10 parts by weight of polyvinyl chloride latex flocculate (obtained from Zeon ® 351 latex, sold by Zeon Co., according to the method of Japanese Patent Application Kokai No. 105407/76) was added thereto.

The glass fiber-containing two layer non-woven sheet substrate had a top layer of 55 g/m$^2$ and a back layer of 25 g/m$^2$.

To the top layer, were applied polyvinyl chloride sols having various viscosities in an amount sufficient to impregnate the substrate. The thus obtained impregnated sheet was observed or tested with respect to the penetration of the sol and the interfacial strength. The results are shown in Table 1.

From the Table 1, it will be appreciated that when a substrate having the same porosity is impregnated with such a low viscosity sol that the sol strikes through to the surface of the back layer the interfacial strength increases, while when a highly viscous sol having such a high viscosity that the sol does not strike through is used the interfacial strength does not increase to such extent.

When the porosity of the top layer of the substrate is made low to suppress the penetration of the sol, the sol does not reach the back layer and does not contribute to the improvement of the interfacial strength.

Even in case of a substrate having same porosity the striking-through to the back layer surface of the sol is well suppressed and the interfacial strength is markedly improved when polyvinyl chloride fiber or polyvinyl chloride latex flocculate is incorporated in the back layer.

Table 1

| Example No. | *Porosity of Top layer cc/cm²/sec | Polyvinyl chloride in back layer | Porosity of substrate cc/cm²/sec | Viscosity grade of applied sol | Result Striking-through (amount) | Interfacial strength kg/50 mm |
|---|---|---|---|---|---|---|
| 1 | 20.0 | non | 12.0 | low | much | 4.0 |
| 2 | " | " | " | medium | somewhat much | 3.0 |
| 3 | " | " | " | high | non | 1.5 |
| 4 | 10 | " | 6 | low | somewhat much | 2.5 |
| 5 | " | " | " | medium | non | 1.5 |
| 6 | " | " | " | high | non | 1.2 |
| 7 | 20 | fiber | 12.0 | low | somewhat much | 4.0 |
| 8 | " | " | " | medium | non | 4.0 |
| 9 | " | " | " | high | non | 3.5 |
| 10 | " | flocculant | " | low | non | 4.0 |
| 11 | " | " | " | medium | non | 4.0 |
| 12 | " | " | " | high | non | 3.5 |

EXAMPLES 13-20

Examples 7 and 10 were repeated provided that the amounts of polyvinyl chloride fiber and polyvinyl chloride latex flocculate were respectively changed as shown in Table 2 which showed the results.

Table 2

| Example No. | Porosity of top layer cc/cm²/sec. | Polyvinyl chloride in back layer Kind | Amount added % | Porosity of substrate cc/cm²/sec. | Viscosity of polyvinyl chloride sol | Results Striking-through (amount) | Interfacial strength kg/50 mm |
|---|---|---|---|---|---|---|---|
| 13 | 20.0 | fiber | 5 | 12.0 | high | non | 1.7 |
| 14 | " | " | 10 | " | " | " | 2.5 |
| 15 | " | " | 20 | " | " | " | 3.5 |
| 16 | " | " | 40 | " | " | " | 3.5 |
| 17 | " | flocculant | 5 | " | " | " | 1.8 |
| 18 | " | " | 10 | " | " | " | 2.7 |
| 19 | " | " | 20 | " | " | " | 3.5 |
| 20 | " | " | 40 | " | " | " | 3.5 |

From the Table 2 it will be appreciated that the amount of the polyvinyl chloride fiber or polyvinyl chloride latex flocculate is in the range of 5 to 40% by weight, and preferably 10 to 40% by weight based on the total weight of the back layer.

EXPERIMENTS 1-12

Using the slurries of the basic materials shown in Example 1, but incorporating 10 parts by weight of polyvinyl chloride fiber (Experiments 4-6) and 10 parts by weight of polyvinyl chloride latex flocculate (Experiments 7-9) in the basic materials of the top layer, in place of the back layer, glass fiber-containing two layer non-woven sheet substrates were produced. The substrates were treated with polyvinyl chloride sol in the same way as in Example 1, observed and tested. The results are shown in Table 3.

From the Table 3, it will be appreciated that the two layer glass sheet in which the top layer contains polyvinyl chloride fiber or polyvinyl chloride latex flocculate tends not to allow the penetration of the sol and does not contribute the improvement of the interfacial strength. When the top layer is made very porous and the back layer is made dense the penetration of the sol to the back layer surface can be suppressed, but the interfacial strength of the impregnated sheet is not improved.

Table 3

| Experiment No. | Top layer Polyvinyl chloride | Top layer Porosity cc/cm²/sec. | Porosity of back layer cc/cm²/sec. | Porosity of substrate cc/cm²/sec. | Viscosity of sol | Results Striking-through (amount) | Interfacial strength kg/50 mm |
|---|---|---|---|---|---|---|---|
| 1 | non | 20 | 50 | 12 | low | much | 4.0 |
| 2 | " | " | " | " | medium | somewhat much | 3.0 |
| 3 | " | " | " | " | high | non | 1.5 |
| 4 | fiber | " | " | " | low | somewhat much | 2.5 |
| 5 | " | " | " | " | medium | non | 1.2 |
| 6 | " | " | " | " | high | non | 1.2 |
| 7 | flocculant | 10 | " | 8 | low | non | 1.3 |
| 8 | " | " | " | " | medium | non | 1.2 |
| 9 | " | " | " | " | high | non | 1.2 |
| 10 | non | 12.0 | 5 | 3 | low | non | 1.5 |
| 11 | " | " | " | " | medium | non | 1.2 |

Table 3-continued

| Experiment No. | Top layer | | Porosity of back layer cc/cm²/sec. | Porosity of substrate cc/cm²/sec. | Viscosity of sol | Results | |
|---|---|---|---|---|---|---|---|
| | Polyvinyl chloride | Porosity cc/cm²/sec. | | | | Striking-through (amount) | Interfacial strength kg/50 mm |
| 12 | " | " | " | " | high | non | 1.2 |

What is claimed is:

1. A two-layer water-laid glass fiber-containing non-woven sheet substrate comprising a top layer of a mixture of glass fibers with at least one other fiber selected from the group consisting of pulp, cotton, wool, rock wool, asbestos, rayon, polyvinyl alcohol synthetic fibers, polyamide fibers and polyester fibers which is capable of being intertwined with glass fibers and a back layer of a mixture of the said other fiber with at least one member, in an amount of 5 to 40% by weight based on the said back layer, selected from the group consisting of polyvinyl chloride fibers and polyvinyl chloride latex flocculate, the top and back layers containing a polyvinyl alcohol fiber binder in an amount of at least 5% by weight based upon the total weight of the fibers in the substrate, and the amount of the said glass fibers being 35% by weight or more based on the said substrate, the top layer of the substrate being impregnated with polyvinyl chloride sol without striking through the back layer.

2. The non-woven sheet substrate of claim 1, wherein the amount of polyvinyl alcohol is 5 to 30% by weight based on the total amount of the fibers.

3. A process for producing a two-layer glass fiber-containing non-woven sheet substrate, which comprises water-laying onto a water-laid glass fiber containing top layer sheet formed from a slurry mixture of glass fibers with at least one other fiber selected from the group consisting of pulp, cotton, wool, rock wool, asbestos, rayon, polyvinyl alcohol synthetic fibers, polyamide fibers, and polyester fibers, which is capable of being intertwined with glass fibers, and a polyvinyl alcohol fiber binder; a slurry mixture of at least one member selected from the group consisting of polyvinyl chloride fibers and polyvinyl chloride latex flocculate with the said other fiber and a polyvinyl alcohol fiber binder; the total amount of said polyvinylalcohol fiber binder being at least 5% by weight based upon the total weight of the fibers in the substrate the amount of said glass fibers being 35% by weight or more based on the said substrate, and the amount of the said member being 5 to 40% by weight based on the water-laid sheet containing the said member, impregnating the top layer of said substrate with polyvinyl chloride sol without striking through the back layer and heating the impregnated substrate to effect gellation of the polyvinyl chloride sol.

4. The process according to claim 3, wherein the polyvinyl chloride latex flocculate has a grain size of 100 to 500 microns.

5. The process according to claim 3, wherein the amount of the polyvinyl alcohol present is 5-30% by weight based on the total amount of the fibers.

6. A process for producing a two-layer glass fiber-containing non-woven sheet substrate, which comprises water-laying onto a water-laid back layer sheet formed from a slurry mixture of at least one member selected from the group consisting of polyvinyl chloride fibers and polyvinyl chloride latex flocculate with at least one fiber selected from the group consisting of pulp, cotton, wool, rock wool, asbestos, rayon, polyvinyl alcohol synthetic fibers, polyamide fibers and polyester fibers, which is capable of being intertwined with glass fibers and a polyvinyl alcohol fiber binder; a top layer slurry mixture of glass fiber with at least one member selected from the group consisting of pulp, cotton, wool, rock wool, asbestos, rayon, polyvinyl alcohol synthetic fibers, polyamide fibers and polyester fibers and a polyvinyl alcohol fiber binder; the amount of said glass fibers being 35% by weight or more based on the said substrate, and the amount of the said member being 5 to 40% by weight based on the water-laid sheet containing the said member, impregnating the top layer of said substrate with polyvinyl chloride sol without striking through the back layer and heating the impregnated substrate to effect gellation of the polyvinyl chloride sol.

* * * * *